United States Patent [19]
Jayne

[11] 3,921,014
[45] Nov. 18, 1975

[54] BOUNCE DRIVE SYSTEM

[75] Inventor: Theodore D. Jayne, Painesville, Ohio

[73] Assignee: The United States of America as represented by the Secretary of the Navy, Washington, D.C.

[22] Filed: Oct. 23, 1973

[21] Appl. No.: 406,072

Related U.S. Application Data

[63] Continuation-in-part of Ser. No. 749,521, July 26, 1968, Pat. No. 3,882,736.

[52] U.S. Cl................ 310/8.1; 73/517 R; 310/8.4; 318/116
[51] Int. Cl.²......................................... H01V 7/00
[58] Field of Search ......... 73/516 R, 517 R, 517 B; 310/8.4, 8.1; 318/127, 128, 132, 116

[56] References Cited
UNITED STATES PATENTS

| | | | |
|---|---|---|---|
| 3,045,476 | 7/1962 | Bell.................................. | 318/128 |
| 3,331,239 | 7/1967 | Larsen et al...................... | 318/132 |

Primary Examiner—Maynard R. Wilbur
Assistant Examiner—T.M. Blum
Attorney, Agent, or Firm—R. S. Sciascia; Henry Hansen

[57] ABSTRACT

A system providing an electrical pulse to mechanically drive a first piezoelectric element upon receipt of an electrical signal from a mechanically driven second piezoelectric element. The system is adapted to provide a preselected frequency of from 16 to 115 impulses per second. The electrical signal from the second piezoelectric element is processed through a voltage comparator by comparison with a reference voltage and applied to a pulse stretcher circuit. The pulse stretcher circuit controls the gate of a silicon controlled rectifier which provides a signal from a power supply to an autotransformer that boosts the voltage from the power supply and applies the voltage to the second piezoelectric element. The pulse stretcher provides the additional function of preventing oscillation in the circuit.

4 Claims, 3 Drawing Figures

BOUNCE DRIVE SYSTEM

CROSS-REFERENCES TO RELATED APPLICATIONS

This is a continuation-in-part of application Ser. No. 749,521, filed July 26, 1968, now U.S. Pat. No. 3,882,736.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to apparatus for maintaining an object in a bouncing state and more particularly to a system for sensing the location and providing the drive for the object to place it and retain it in the bouncing state.

There are a variety of applications for objects kept in a bouncing state. For example such objects can be used in the testing of the performance of vehicles, such as a vehicle moving on a straight horizontal track, a vehicle moving with 2° of freedom on a flat surface, or a vehicle such as an airborne or space vehicle which, at different times, may move with 1°, 2° or 3° of linear motion. However, beyond the mere deriving of test data, such information in many applications is also of great importance in enabling ascertainment of the position and motion of a vehicle for purposes such as navigation, guidance and control. In one important group of applications it is important to be able to sense acceleration of an object by means of apparatus carried with the object, as in the inertial guidance and control of air and space vehicles.

A more extensive discussion of sensors for the latter type of use is described in application Ser. No. 749,521 of Theodore D. Jayne entitled Apparatus for Maintaining an Ojbect in Bouncing Motion, and for Sensing and Indicating the Position and/or Motion Thereof, of which the present invention is a continuation-in-part.

SUMMARY OF THE INVENTION

Accordingly, it is a general purpose and object of the invention to provide new and useful apparatus applicable to systems for sensing and indicating the motion of an article such as a vehicle. It is an additional object to provide a system for maintaining an object such as a ball in a bouncing state. A further object is to provide a system that senses the position of the ball and provides drive to the ball for maintaining its bounce. Another object is to provide a system that provides an initial drive for placing the ball in a bouncing state.

These and other objects are accomplished according to the present invention by providing apparatus containing a ball for bouncing and separate sensor and driver for maintaining the ball in a bouncing state between predetermined limits. The ball on striking a surface causes an electrical signal to be generated by a first transducer. The electrical signal is amplified by fast operating circuitry responsive to electrical signal. The amplified electrical signal is applied to a second transducer that supplies a mechanical force on the bouncing ball prior to its leaving the surface. The elapsed time from when the first transducer generates a signal to when the amplified signal is provided to the second transducer is approximately 2 $\mu$sec.

DESCRIPTION OF THE PREFERRED EMBODIMENT

Figure 1:
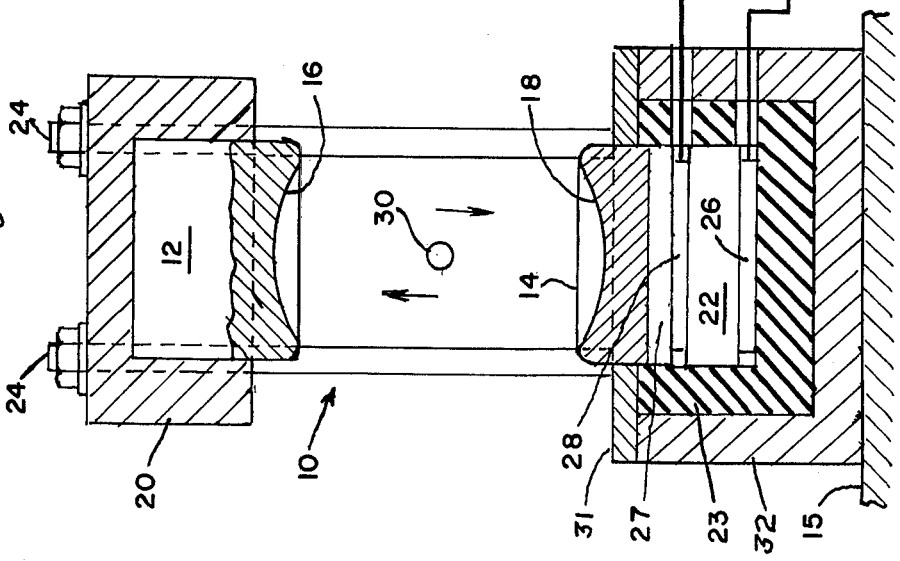
FIG. 1 is an illustration partially in block diagram of a system for maintaining an object in a bouncing state.

Referring now to FIG. 1 there is shown a system employing the invention. A cell 10 comprises an upper pedestal 12 and an opposed lower pedestal 14, each of which is circular in horizontal cross-section and has an interior concave striking surface of generally spherical form as shown at 16 and 18, respectively. Upper pedestal 12 is mounted on the lower side of a relatively massive backing block 20 while pedestal 14 is mounted on the upper surface of a first piezoelectric disc 27 having an electrode 28. A second piezoelectric disc 22 having an electrode 26 is located beneath electrode 28. Discs 27 and 22 can be made of lead zirconite titanite, such as that known commercially as Clevite PZT-4. Discs 27 and 22 with electrodes 26 and 28 are insulatedly mounted in a recess of mounting block 23. Block 23 is held in place by frames 31 and 32. The pedestals 12 and 14 are held in position by an appropriate mounting means, such as rods 24, which are few enough in number and sufficiently spaced apart to enable a clear view through the cell from the aides at least at one angle and in some cases at several angles, so as to permit optical sensing of the position of the ball within the cell 10 without interference from the rods. The cell 10 may be supported on a grounded support frame 15.

A ball 30 of hard resilient material is given impetus to bounce back and forth between the striking surfaces 16 and 18 of the curved pedestals by pulsed actuation of the piezoelectric disc 22. Disc 22 is responsive to voltage pulses applied to electrode 26 to cause the piezoelectric disc 22 to expand along the direction between its major surfaces and thus impart an upwardly directed mechanical impulse or shock wave to the lower side of pedestal 14 through disc 27. The wave is transmitted through the pedestal to the striking surface 18. By applying mechanical impulses to surface 18 when ball 30 is in contact with it, translational kinetic energy is imparted to the ball 30 to make up for energy lost in transit of the ball 30 and thereby to maintain it in its bouncing state.

The voltage pulses for operating the piezoelectric element 22 are supplied from high speed control circuitry 38. In order to produce output pulses from the high speed control circuitry at the proper times to maintain bouncing of the ball, the times of impingement of the ball upon the lower pedestal 14 are sensed to produce control pulses for triggering the control circuitry 38 into operation. In the present example, the initial contact of ball 30 against striking surface 18 produces a shock wave in pedestal 14 which travels through it to the upper surface of piezoelectric disc 27, and the resultant instantaneous pulse of pressure between the opposite major surfaces of the piezoelectric disc 27 induces an output voltage pulse between electrode 28 and grounded pedestal 14 which is applied to the high speed driver circuitry 38 via electrical lead 40 as a triggering impulse. In response to this triggering impulse, the latter circuitry nearly instantaneously returns a driving pulse along connecting lead 42, causing the piezoelectric disc 22 to deliver an upward impulse to the ball while it is still in contact with the pedestal 14.

Figure 2:
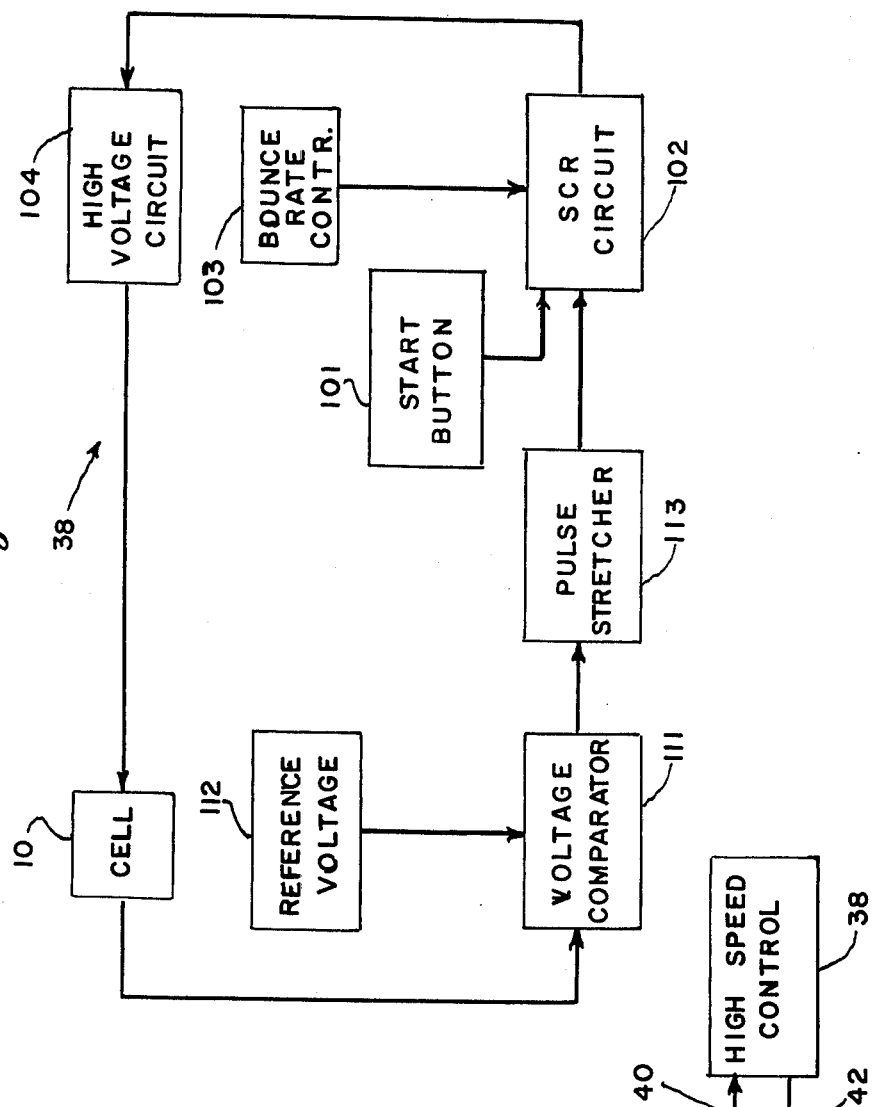
FIG. 2 is a block diagram of the system of FIG. 1.

Referring now to FIG. 2 there is shown a block diagram of the high speed driver circuitry 38 and cell 10 of FIG. 1. The driver circuitry 38 provides the function of starting and retaining an object such as a metal ball 30 (FIG. 1) in bouncing motion. A start push button 101 is depressed to fire an SCR circuit 102 which is provided with a signal from bounce rate controller 103. The SCR circuit 102 conducts the signal from controller 103 to high voltage circuit 104 which steps up the voltage of the signal and applies the signal to cell 10. Cell 10 on receipt of the signal from high voltage circuit 103 gives the ball 30 a mechanical impulse to start in bouncing motion. The striking of the bottom of the cell 10 by the ball 30 sends a signal to voltage comparator 111. A reference voltage 112, which may be ground, is also supplied to comparator 111. On the striking of the bottom of the cell 10 by the ball, the signal from cell 10 exceeds the reference voltage and the voltage comparator 111 provides a positive signal at its output. This positive signal is applied to pulse stretcher 113 which provides a signal to SCR circuit 102. SCR circuit 102 functions as before and keeps the ball in bouncing motion.

Figure 3:
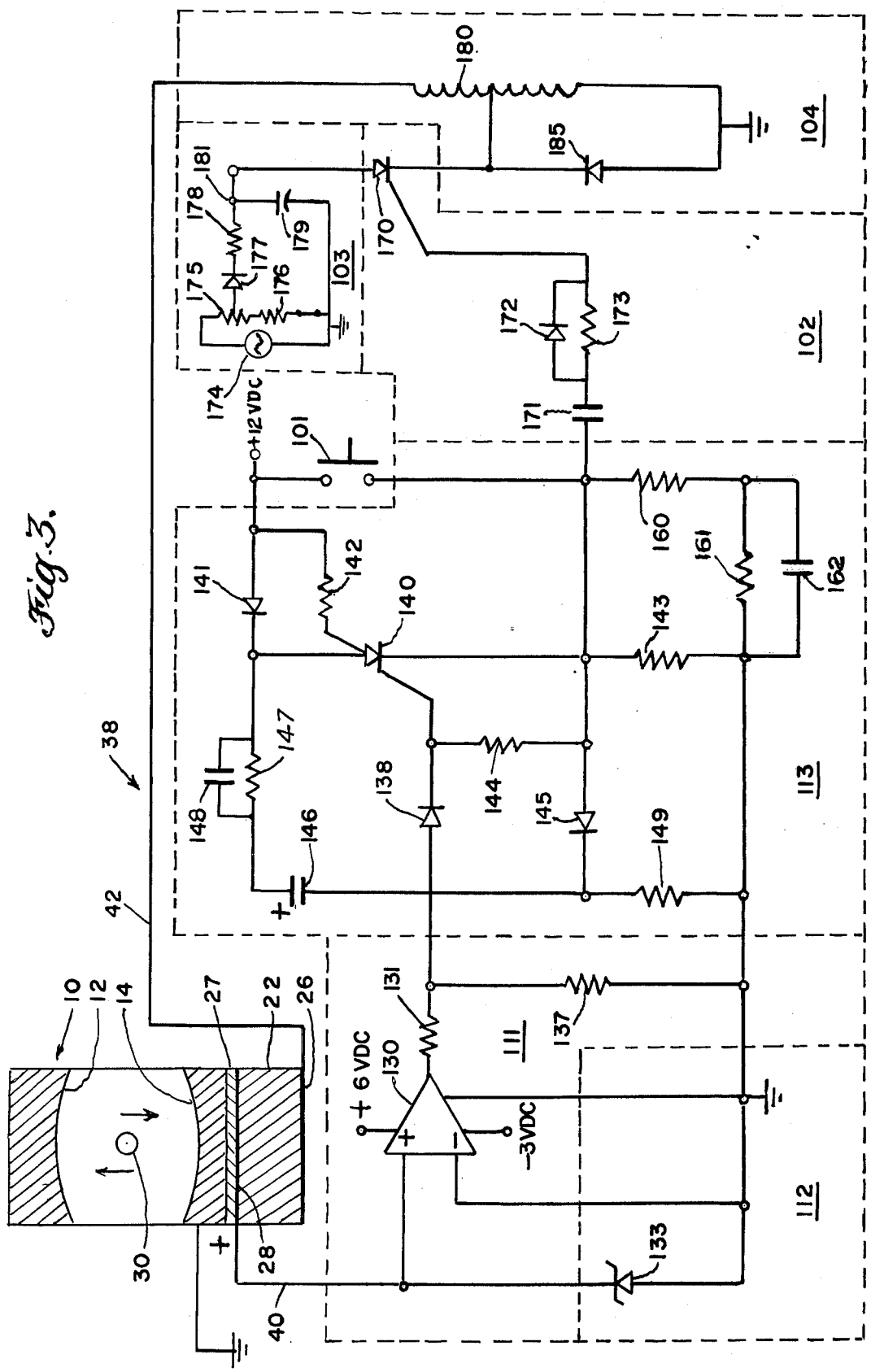
FIG. 3 is a schematic representation of the block diagram of FIG. 2.

FIG. 3 shows a schematic diagram of the system of FIG. 2. In the diagram the cell 10 is shown with its lower metallic pedestal 14 grounded. Upper metallic pedestal 12 together with lower pedestal 14 form the boundaries between which the ball 30 bounces. A thin piezoelectric crystal 27 on sensing a bounce on lower metallic pedestal 14 generates a signal that is conducted to the remainder of the circuit by means of electrode 28 and line 40. Line 40 is connected to electrode 28 and conducts the signal generated by disc 27 to voltage comparator amplifier 130. Comparator 130 compares the incoming signal on the positive terminal with its grounded negative terminal and upon sensing a positive incoming signal provides an output positive signal across a voltage divider comprised of resistors 131 and 137. In addition the amplifier 130 has a zener diode 133 connected to its input positive terminal for protection against any excessive transients that may occur.

The signal across divider 131, 137 is then applied to the cathode gate electrode of silicon controlled switch 140 through diode 138 which causes switch 140 to fire. SCS 140 has its anode connected to a +12VDC supply through a diode 141 and its gate anode connected to the same voltage supply through a resistor 142. The cathode of SCS 140 is connected to ground through a resistor 143. The cathode and cathode gate of SCS 140 are connected by means of resistor 144. SCS 140 has its anode and cathode connected by means of the series connection of diode 145, capicitor 146 and parallel connected resistor 147 and capacitor 148 capacitor 146 and the cathode of diode 145 are connected to ground through resistor 149. The SCS 140 and its associated components form pulse stretcher 113.

On firing, the anode of SCS 140 is raised to approximately 24 VDC while the anode gate receives the 12 VDC supply. Capacitors 146 and 148 then discharge returning the SCS 140 anode to approximately 12 VDC and shutting off the SCS since by that time the signal on the cathode gate and any possible recurrences of the signal have been removed.

On manual operation of start button 101 or firing of SCS 140 a signal is applied to the gate electrode of silicon controlled rectifier 170 through capacitor 171 and the parallel combination of diode 172 and resistor 173.

The anode of SCR 170 receives its voltage supply from bounce rate controller 103 which comprises an a.c. voltage source 174, having one side grounded, connected across adjustably tapped resistor 175 and fixed resistor 176. The position of the tap on resistor 175 determines the level of voltage applied to series connected rectifier diode 177 and resistor 178. A charging capacitor 179 is then connected.

The start push button 101 is connected between the 12VDC supply and the cathode of SCS 140. A parallel connection of resistor 161 and capacitor 162 connect one side of start button 101 to ground; the parallel connection is located between resistor 160 and ground. A junction 181 located between resistor 178 and capacitor 179 is connected to the anode of SCR 170. Prior to firing of SCR 170 a rectified voltage is formed across the plate of capacitor 179. This voltage discharges upon conduction of SCR 170 so that shortly after firing the SCR 170 anode voltage is unable to maintain firing and shuts off.

The SCR 170 on firing supplies a signal to autotransformer 180 that supplies a high voltage signal to electrode 26 piezoelectric crystal transducer 22 that converts the electrical energy into a mechanical energy and supplies an upward thrust to ball 30. A diode 185 is connected across the primary coil portion of transformer 180 and prevents excessive counter e.m.f. from developing across the primary coil and damaging SCR 170.

In routine operation of the system the ball 30 strikes the pedestal 14 so that a voltage forms on disc 27. This voltage is applied to voltage comparator amplifier 130. Comparator 130 on sensing the applied voltage supplies a signal to SCS 140 that fires for a predetermined period of time. SCS 140 on firing supplies a signal to the gate of SCR 170 that causes SCR 170 to fire for a short period of time until capacitor 179 sufficiently discharges. SCR 170 supplies a signal to autotransformed 180 that increases the voltage of the signal and supplies it to piezoelectric crystal 22. Crystal 22 supplies a mechanical impulse to ball 30 to keep the ball 30 in motion. In addition a positive voltage can be impressed on conductor 40 due to the force from transducer 22 transferring mechanical motion to transducer 27. This signal however will not cause oscillatin in the circuit due to the firing time of SCS 140 which will not shut off until this signal from transducer 27 has diminished.

It has therefore been shown a bounce drive system for use in keeping a ball 30 in motion between pedestals 12 and 14 in which the circuit 38 is responsive to the ball 30 striking the pedestal 14. The circuit 38 has the capability to return a high voltage signal to transducer 22 causing a mechanical drive on the ball 30 prior to its leaving the surface of the pedestal. This system has been found to be applicable for use when the bounce rate is between 16 and 115 bounces per second. The bounce contact time is about 8 $\mu$sec. The bounce rate may be varied by varying the size of the cell or the voltage applied to transducer 22.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A high speed driver comprising:

a first transducer for converting a mechanical impulse to an electrical signal;

a comparator circuit connected to said first transducer for providing a first output signal upon said electrical signal exceeding a predetermined magnitude;

a pulse stretcher circuit connected to said comparator circuit for providing a second output signal for a predetermined period of time upon receipt of said first output signal;

a silicon controlled rectifier circuit connected to said pulse stretcher circuit for providing a third output signal upon receipt of said second output signal;

a bounce rate controller circuit connected to said silicon controlled rectifier circuit for determining the magnitude and duration of said third output signal;

a manual controller connected to said silicon controlled rectifier circuit for providing an enabling signal to said silicon controlled rectifier circuit to enable said rectifier circuit to provide said third output signal;

a second transducer adapted to receive said third output signal for converting said third output signal to a mechanical impulse;

a high voltage circuit connected between said silicon controlled rectifier circuit and said second transducer for increasing the voltage of said third output signal;

said first and second transducers comprised of piezoelectric material;

said comparator circuit including a voltage comparator for comparing said electrical signal with a reference signal and providing a positive output signal upon the voltage of said electrical signal exceeding said reference signal and a voltage divider circuit connected to said voltage comparator for providing said first output signal upon receipt of said positive output signal; and said pulse stretcher circuit including a voltage source and a silicon controlled switch connected to said voltage source and said voltage divider circuit for providing a conduction path for said voltage source to form said second output signal for a predetermined period of time upon receipt of said first output signal.

2. A high speed driver according to claim 1 wherein said bounce rate controller circuit further comprises:

an a.c. voltage source;

rectifier means connected to said a.c. voltage source for supplying a pulsating d.c. voltage; and a capacitor connected to said rectifier means for receiving said d.c. pulsating voltage and connected to said silicon controlled rectifier circuit for supplying said third output signal on demand.

3. A high speed driver according to claim 2 wherein said high voltage circuit further comprises an autotransformer for increasing the voltage of said third output signal.

4. A high speed driver according to claim 3 further comprising:

a bounce cell having an upper and lower pedestal with said lower pedestal connected in juxtaposition to said first transducer and said second transducer connected in juxtaposition to said first transducer so that mechanical impulses received by said lower pedestal can be converted to electrical signals by said first transducer and electrical signal received by said second transducer can be converted into mechanical impulses that are received by said lower pedestal.

* * * * *